US011319867B2

(12) United States Patent
Parsi

(10) Patent No.: US 11,319,867 B2
(45) Date of Patent: May 3, 2022

(54) PISTON BOWL FOR AN INTERNAL COMBUSTION ENGINE

(71) Applicant: Perkins Engines Company Limited, Peterborough (GB)

(72) Inventor: Mohammad Parsi, London (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/077,273

(22) PCT Filed: Feb. 9, 2017

(86) PCT No.: PCT/GB2017/050325
§ 371 (c)(1),
(2) Date: Aug. 10, 2018

(87) PCT Pub. No.: WO2017/137750
PCT Pub. Date: Aug. 17, 2017

(65) Prior Publication Data
US 2019/0032545 A1    Jan. 31, 2019

(30) Foreign Application Priority Data
Feb. 12, 2016  (GB) ..................................... 1602581

(51) Int. Cl.
*F02B 23/06*    (2006.01)
(52) U.S. Cl.
CPC .......... *F02B 23/0672* (2013.01); *Y02T 10/12* (2013.01)
(58) Field of Classification Search
CPC ......... F02B 23/0672; F02B 23/06; F16J 1/00; F16J 1/09; F02F 3/24; F02F 3/26; F02F 3/28
See application file for complete search history.

(56) References Cited

U.S. PATENT DOCUMENTS 4,676,210 A * 6/1987 Moser ................ F02B 23/0624
                                                         123/276
7,861,685 B2    1/2011 Sono et al.
(Continued)

FOREIGN PATENT DOCUMENTS

CN      102678260 A    9/2012
CN      102444496 B    9/2013
(Continued)

OTHER PUBLICATIONS

International Search Report related to Application No. PCT/GB2017/050325 dated Apr. 25, 2017.
(Continued)

*Primary Examiner* — Grant Moubry
(74) *Attorney, Agent, or Firm* — von Briesen & Roper, s.c.

(57) ABSTRACT

A piston crown for a piston of an internal combustion engine, the piston crown comprising an annular surface at a first end of the piston crown; and a recessed piston bowl. The piston bowl comprises: a raised floor in the center of the piston bowl; an arcuate surface located radially outward relative to the raised floor; and a lip chamfer surface extending from the arcuate surface to the annular surface. A radially inmost portion of the lip chamfer surface is radially inside the outermost portion of the arcuate surface. The radial distance between the center axis and the innermost edge of the annular surface is between 2.3 and 3.2 time the bowl height. The acute angle between a line extending in the radial direction and a line tangent to the arcuate surface closest to the first end of the piston crown is between 40 and 80 degrees.

17 Claims, 4 Drawing Sheets

(56) References Cited

U.S. PATENT DOCUMENTS

| | | | |
|---|---|---|---|
| 7,992,536 B2 | 8/2011 | Ikeya et al. | |
| 8,156,927 B2* | 4/2012 | Likubo | F02B 23/0672 |
| | | | 123/661 |
| 8,327,537 B2* | 12/2012 | Ribeiro | F02F 3/003 |
| | | | 29/888.04 |
| 8,714,136 B2 | 5/2014 | Ikeya et al. | |
| 8,813,713 B2* | 8/2014 | Gladden | F02B 23/0696 |
| | | | 123/193.6 |
| 9,121,336 B2* | 9/2015 | Lee | F02B 23/0651 |
| 9,284,877 B2* | 3/2016 | Yoo | F02B 23/0696 |
| 9,328,693 B2* | 5/2016 | Pierpont | F02F 3/0076 |
| RE46,806 E * | 4/2018 | Venugopal | F02B 23/0672 |
| 9,938,888 B2* | 4/2018 | Huang | F02B 23/101 |
| 10,288,026 B2* | 5/2019 | Martinez | F02B 23/0672 |
| 2004/0123832 A1* | 7/2004 | Quigley | F02B 23/0672 |
| | | | 123/276 |
| 2010/0162986 A1* | 7/2010 | Grossle | F02B 23/06 |
| | | | 123/193.6 |
| 2011/0146613 A1 | 6/2011 | Oxborrow et al. | |
| 2013/0019838 A1 | 1/2013 | Lee et al. | |
| 2014/0076275 A1 | 3/2014 | Yoo et al. | |
| 2014/0216393 A1 | 8/2014 | Tomoyuki | |
| 2014/0331957 A1 | 11/2014 | Nishida et al. | |
| 2016/0348571 A1* | 12/2016 | Huang | F02B 43/00 |

FOREIGN PATENT DOCUMENTS

| | | |
|---|---|---|
| DE | 10 2005 049443 A1 | 4/2007 |
| EP | 2752564 A1 | 7/2014 |
| EP | 2754874 A1 | 7/2014 |
| EP | 2762563 A1 | 7/2014 |
| FR | 2868480 A1 | 10/2005 |
| GB | 2174756 A | 11/1986 |
| JP | H 03-210021 A | 9/1991 |
| JP | 2001-254621 A | 9/2001 |
| JP | 2004-190572 A | 7/2004 |
| JP | 2013053572 A | 3/2013 |
| JP | 2013-068144 A | 4/2013 |
| JP | 2013-194561 A | 9/2013 |
| JP | 2016502033 A | 1/2016 |
| WO | 2011092459 A1 | 8/2011 |
| WO | WO 2015/135699 A1 | 9/2015 |

OTHER PUBLICATIONS

European Search Report related to Application No. GB1602581.9 completed on Jul. 20, 2016.

* cited by examiner

PISTON BOWL FOR AN INTERNAL COMBUSTION ENGINE

CROSS-REFERENCE TO RELATED APPLICATION

This Application is a 35 USC § 371 U.S. National Stage filing of International Application No. PCT/GB2017/050325 filed on Feb. 9, 2017 which claims priority under the Paris Convention to UK Patent Application No. 1602581.9 tiled on Feb. 12, 2016.

TECHNICAL FIELD

The disclosure relates to the field of internal combustion engines and, in particular, to internal combustion engines having increased efficiency and reduced emissions.

BACKGROUND

Increasing engine efficiency and reducing emissions is a desire of engine manufacturers and users alike.

In recent years, may efforts have focused on developing after-treatment systems configured to process emissions released from a combustion chamber of the internal combustion engine in order that fewer emissions and/or emissions of a different chemical composition are released to atmosphere.

The use of after-treatment systems may increase manufacturing and running costs and, at times, may increase fuel consumption. For example, where an after-treatment system requires a particular temperature to operate effectively, work of the engine may be increased simply to provide thermal energy to the after-treatment system rather than because of a demand for rotational kinetic energy of a crankshaft of the engine.

Against this background there is provided a piston crown for a piston of an internal combustion engine, the piston crown extending in an axial direction along a central axis and in a radial direction outwardly from the central axis, the piston crown comprising: an annular surface at a first end of the piston crown in the axial direction; and a piston bowl located radially within the annular surface and recessed relative to the first end of the piston crown; wherein the piston bowl comprises:

a raised floor in a radially central region of the piston bowl;
an arcuate surface located radially outward relative to the raised floor; and
a lip chamfer surface extending radially outwardly from the arcuate surface and radially inwardly from the annular surface wherein a radially inmost portion of the lip chamfer surface is radially inside the radially outermost portion of the arcuate surface; wherein:
a bowl throat radius, R1, is defined as a distance in the radial direction between the central axis of the piston crown and an innermost edge of the annular surface;
a bowl height, H, is defined as a distance in the axial direction between the annular surface and a surface of the piston bowl furthest from the annular surface;
a lip re-entrancy angle is defined as an acute angle between a line extending in the radial direction at the first end of the piston crown and a tangent to the arcuate surface closest to the first end of the piston crown;
the bowl throat radius, R1, is between 2.3 and 3.2 times the bowl height, H, and: the lip re-entrancy angle is between 40° and 80°

DETAILED DESCRIPTION

Figure 1:
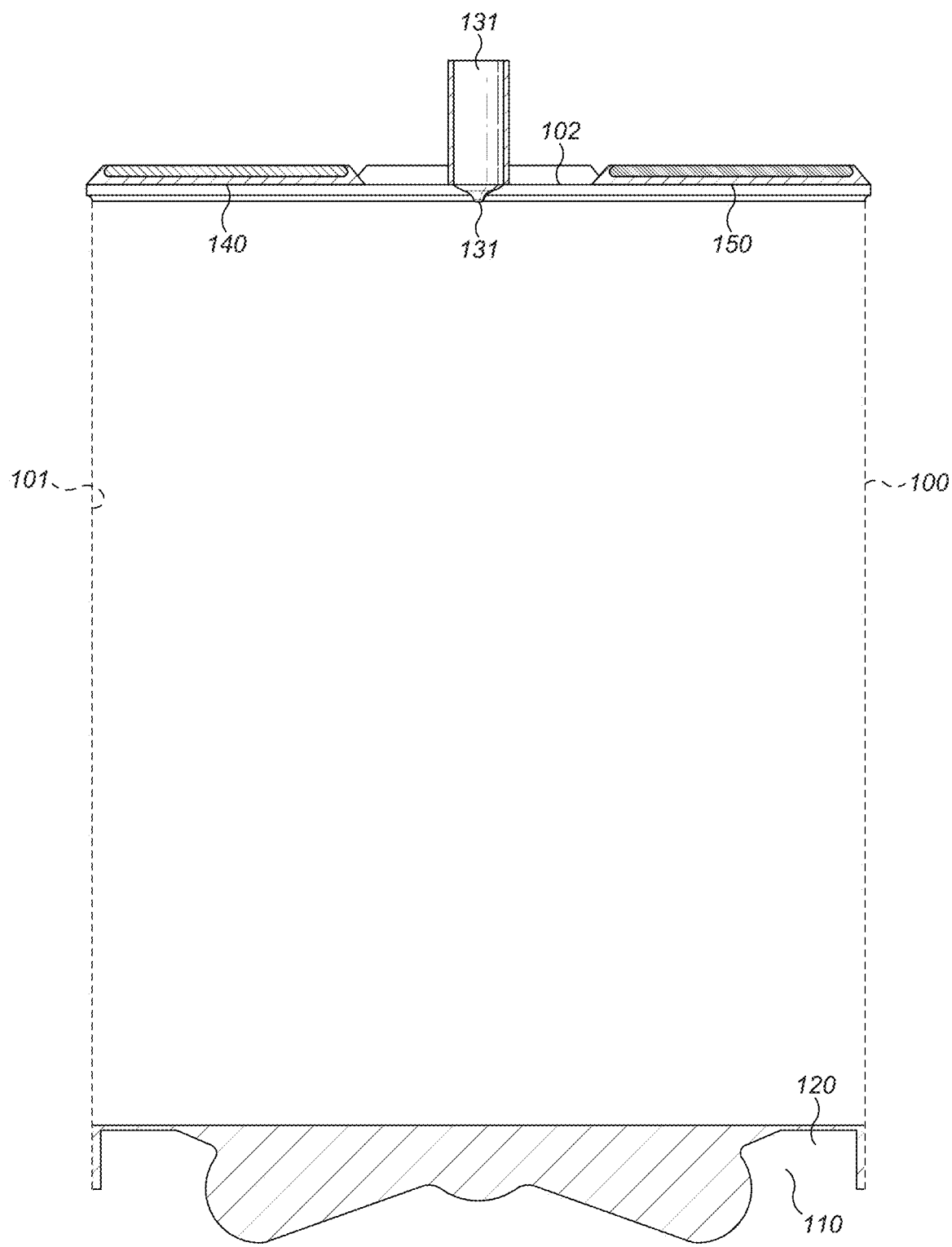
FIG. 1 shows a cross section through a cylinder of an internal combustion engine, at a point in its cycle where a piston in the cylinder is furthest from a fuel injection end of the cylinder.

FIG. 1 shows a cross section through a cylinder 100 of an internal combustion engine (not shown). The cylinder may comprise an internal bore 101. The internal bore 101 may accommodate a piston 110. The piston 110 may be coaxial with the internal bore 101 of the cylinder 100 such that the piston 110 is movable relative to the cylinder 100 in an axial direction.

The cylinder 100 may comprise a fuel injector 130 located a top end 102 of the cylinder 100. The fuel injector 130 may be located coaxially with the internal bore 101 of the cylinder such that fuel injected by the fuel injector 130 may enter the internal bore 101 at the axis. The fuel injector 130 may comprise a fuel injector head (not shown) for distributing fuel in accordance with a desired geometrical arrangement.

The piston 110 comprises a piston crown 120 and a piston body (not shown but located underneath the piston crown 120 in the orientation of FIG. 1). The piston crown 120 may be at a head end of the piston 110 such that the piston crown 120 of the piston 110 faces the fuel injector 130.

The cylinder 100 may further comprise an oxidant inlet 140 for selectively allowing inlet of an oxidant, such as air, to facilitate combustion and an exhaust outlet 150 for selectively allowing release of combustion products from the cylinder 100. The oxidant inlet 140 and the exhaust outlet 150 may be located at the top end 102 of the cylinder 100 adjacent the fuel injector 130.

In FIG. 1, the piston 110 is shown relative to the cylinder 110 at a position in its oscillating cycle that is furthest from the top end 102 of the cylinder 100.

Figure 2:
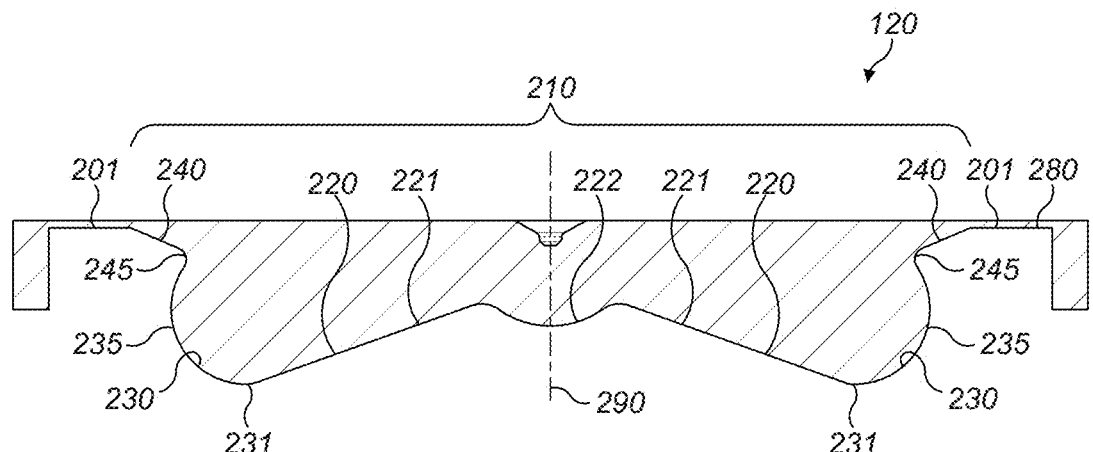
FIG. 2 shows a cross section through a piston crown of the piston shown in FIG. 1 at a point in its cycle where the piston is closest to the fuel injection end of the cylinder.

FIG. 2 shows an enlarged view of top end 102 of the cylinder 110 and with the piston crown 120 adjacent the top end 102. This occurs when the position 110 is present in the cylinder 110 in a position that is closest to the top end 102 of the cylinder 100.

Referring to the FIG. 2 representation, the piston crown has an axial direction that sits vertically in the orientation of FIG. 2 and a radial direction that sits horizontally in the orientation of FIG. 2. The piston crown 120 may be rotationally symmetrical about a central axis 290 in the axial direction. The central axis 290 of the piston crown 120 may, when in situ in the cylinder, be coaxial with a central axis of the fuel injector 130.

The piston crown 120 comprises an annular surface 201 at a first end 280 of the piston crown 120 in the axial direction that, when in situ in the cylinder, faces the fuel injector 130. The annular surface 201 may be radially furthest from the central axis 290.

The piston crown 120 further comprises a piston bowl 210 located radially within the annular surface 201 and recessed relative to the first end 280 of the piston crown.

The piston bowl 210 comprises a raised floor 220 in a radially central region of the piston bowl 120. The piston bowl 210 further comprises an arcuate surface 230 located radially outward relative to the raised floor 220. The piston bowl 210 further comprises a lip chamfer surface 240 extending radially outwardly from the arcuate surface 230 and radially inwardly from the annular surface 201. A radially inmost portion 245 of the lip chamfer 240 surface is radially inside the radially outermost portion 235 of the arcuate surface 230.

As noted above, the FIG. 2 representation shows a cross-section through the central axis 290 of the piston crown 120 and, in this embodiment, the piston crown 120 is rotationally symmetrical about the central axis 290. Accordingly, the piston bowl 210 has a circular throat facing the direction of the fuel injector 130. The piston bowl 210 has a bowl throat radius, R1, defined as a distance in the radial direction between the central axis 290 of the piston crown 120 and the radially inmost portion 245 of the annular surface 240.

The piston bowl 210 has a bowl height, H, is defined as a distance in the axial direction between the annular surface 201 and a surface 231 of the piston bowl furthest from the annular surface 201. In the illustrated embodiment the surface 231 of the piston bowl furthest from the annular surface 201 is located at a radially inner point of the arcuate surface 230 where it meets the raised floor 220.

Lip re-entrancy refers to a way in which fuel that is injected into the piston bowl with a radially outward component of velocity is redirected, at least in part by virtue of the geometry of the piston bowl, so as to gain a radially inward component of velocity. This may be effected at least in part by virtue of the arcuate surface 230 providing a radial route by which fuel is encouraged to flow from direction having a radially outward component and an axially downward component to a direction having a radially inward component and axially upward component (wherein upward is towards the fuel injector 130).

A lip re-entrancy angle may be defined as an acute angle between a line extending in the radial direction at the first end 280 of the piston crown 120 and a tangent to the arcuate surface 230 closest to the first end 280 of the piston crown 120.

In the illustrated embodiment of FIG. 2, the raised floor 220 comprises a frusto-conical surface 221 tapering towards the first end 280 of the piston crown 120 and a pip 222 in an end of the frusto-conical surface 221 closest to the first end 280 of the piston crown. The pip 222 comprises a spherical domed indentation in the tapered end of the frusto-conical surface 221. A central axis of the frusto-conical surface 221 and the pip is coaxial with the central axis 290 of the piston crown 120 such that the pip is directly facing the fuel injector 130.

Figure 3:
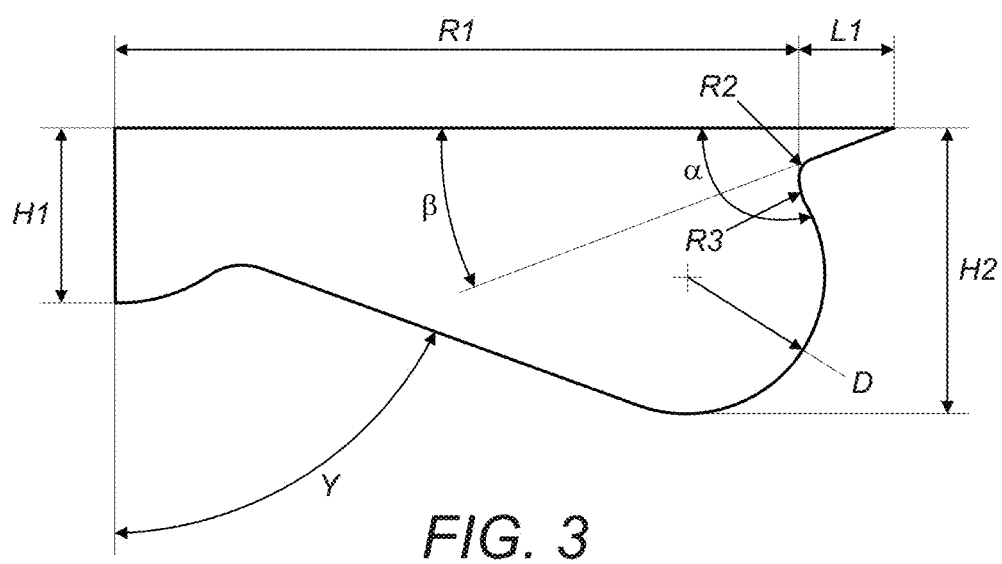
FIG. 3 is an enlarged view of a cross section through half of the piston crown.

Referring to FIG. 3, dimensions of one exemplary embodiment of the piston crown 120 are as follows:

| | | |
|---|---|---|
| Radial width of lip chamfer surface | $3.0 < L1 < 7.0$ mm | (5.0 mm nominal) |
| Axial distance between annular surface and lowest part of pip | $8.0 < H1 < 10.0$ mm | (9.38 mm nominal) |
| Axial depth of piston bowl | $13.0 < H2 < 17.0$ mm | (15.2 mm nominal) |
| Radius 2 | $0.5 < R2 < 1.5$ mm | (1.0 mm nominal) |
| Radius 3 | $2.0 < R3 < 4.0$ mm | (3.0 mm nominal) |
| Nominal diameter of cross section of arcuate surface | $13.0 < D < 17.0$ mm | (14.6 mm nominal) |
| Angle | $100° < \alpha < 140°$ | (120° nominal) |
| Re-entrant angle, $\theta = 180 - \alpha$ | $40° < \theta < 80°$ | (60° nominal) |
| Angle | $10° < \beta < 30°$ | (21° nominal) |
| Angle | $60° < \gamma < 80°$ | (70° nominal) |
| Ratio of bowl throat radius to cylinder bore | $0.63 < [R1/\text{Cylinder Bore}] < 0.74$ | (0.684 nominal) |
| Ratio of maximum bowl radius to bowl height | $2.3 < [(R1 + L1)/H2] < 3.2$ | (2.69 nominal) |

In terms of relative dimensions, in particular, the bowl throat radius, R1, is between 2.3 and 3.2 times the bowl height, H. In addition, and relative to the internal bore 101 of the cylinder 100 in which the piston crown 120 resides in use, the piston bowl maximum radius ($R_{max}$=R1+L1) is between 2.3 and 3.2 times the maximum axial height H2 of the piston bowl 120.

The lip re-entrancy angle is between 40° and 80° and, in the illustrated embodiment of FIG. 3, the lip re-entrancy angle is 61°.

INDUSTRIAL APPLICATION

A combination of lip re-entrancy characteristics, wide bowl entry, lip re-entrancy angle, and wide pip angle contributes to enhanced in-cylinder gas velocities and fuel distribution during the injection process. Lip re-entrancy within the scope of the present disclosure may result in generating local turbulence to promote air-fuel mixing. The lip chamfer may help to contribute to increased uniformity and balance in fuel distribution via spray/bowl interactions. Increased in-cylinder air turbulence results in more rapid mixing of air and fuel. This increases the proportion of fuel that combusts within the cylinder.

Aspects of the disclosure may be particularly relevant to direct injection compression ignition engines fitted with high pressure fuel systems as in common rail in which the injection of fuel at high pressure may cause it to atomise readily for dispersion by turbulence of fluid in the combustion chamber.

Modelling has shown that these features result in reductions in unburnt fuel and so result in reductions in soot emissions that might otherwise need to be processed in an after-treatment system configured to receive exhaust from the cylinder for processing. Moreover, this reduction in unburnt fuel has been shown to apply over a wide range of injection timings and is more tolerant to injection retard. Moreover, a trade-off between soot and $NO_x$ emissions may also be improved.

In short, the piston bowl 120 of the present disclosure results in improved fuel spray velocity, improved fuel distribution, faster fuel evaporation, increased turbulence, increased uniformity of in-cylinder fuel distribution, increased oxidant utilisation in combination result in more efficient combustion and reduced quantities of unburnt fuel released from the cylinder following a combustion event, so resulting in reduced emissions and therefore reduced requirement for downstream after-treatment of exhaust.

Figure 4A:
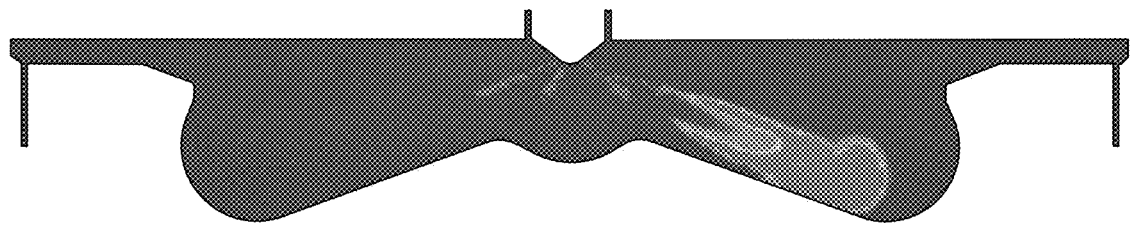
FIG. 4 shows representations of fuel spray behaviour within the piston crown.
Figure 4B:
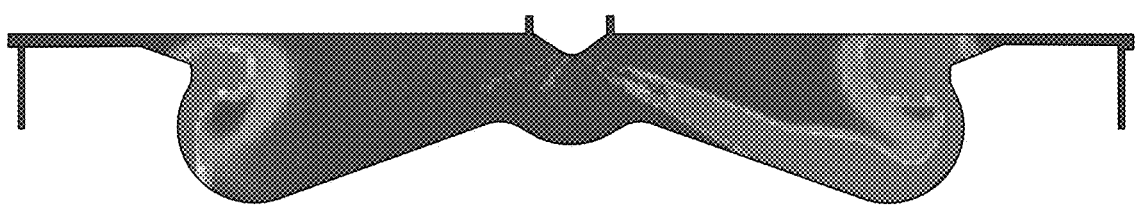
Figure 4C:
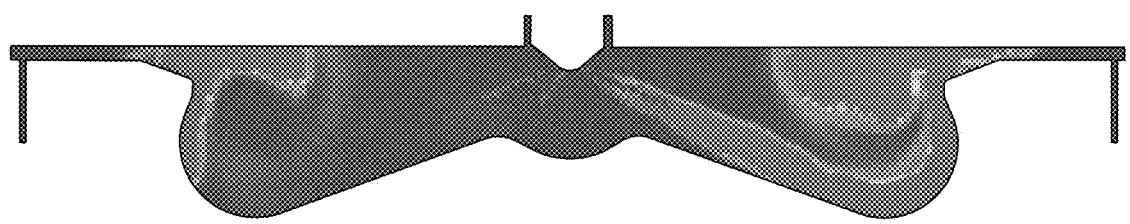

FIGS. 4(a) to 4(c) show fuel distribution behaviour at successive times following injection. FIGS. 4(b) and 4(c), in particular, demonstrate increased turbulence in the vicinity of the radially inmost portion 245 of the lip chamfer 240 surface.

Figure 5:
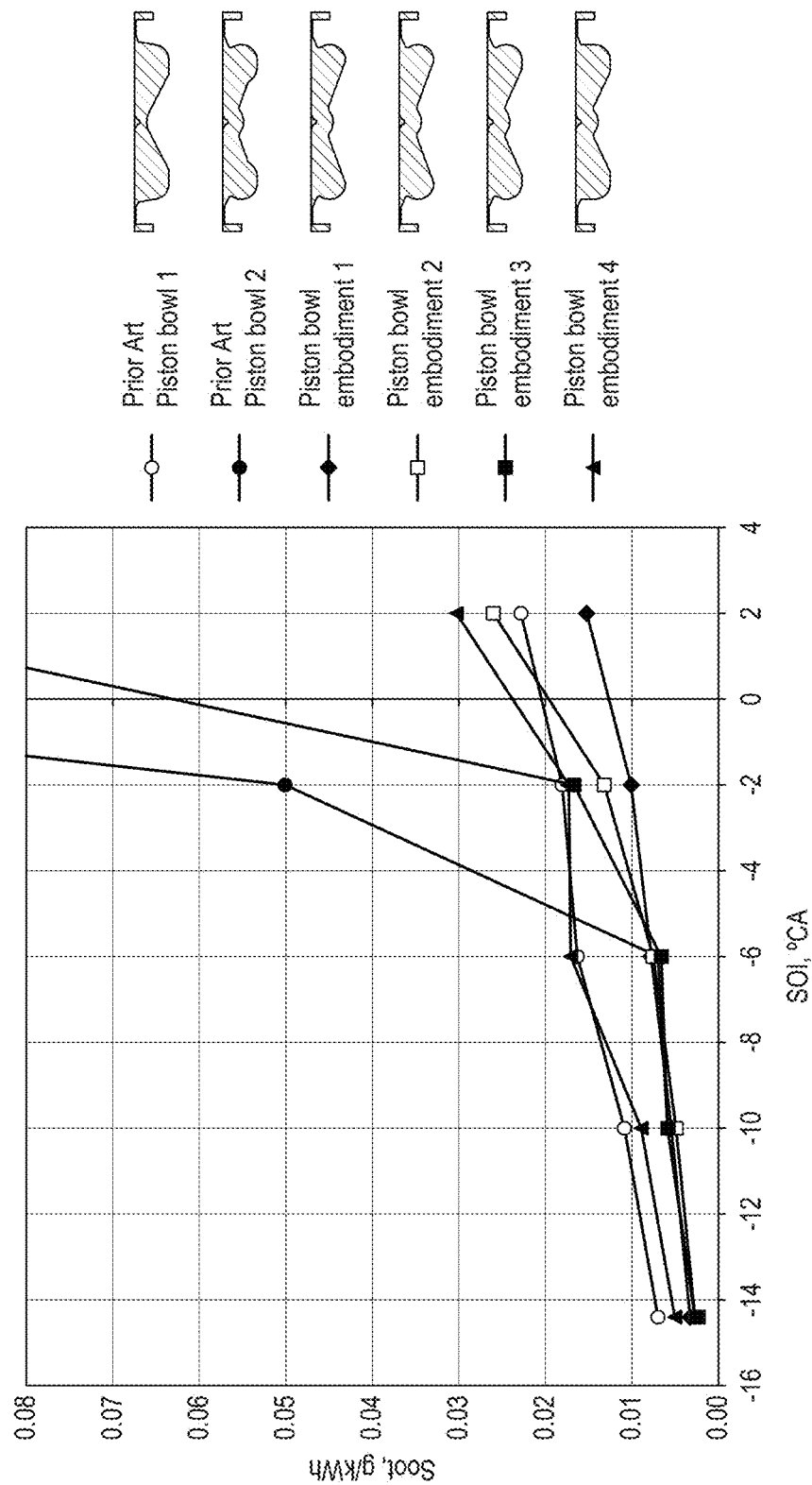
FIG. 5 shows plots representative of soot tolerance to injection retard for various designs of piston crown, including that shown in FIGS. 1 to 4.

FIG. 5 shows how the claimed combination of piston crown 120 features contributes to significant improvements to emissions, by comparison with other piston crown designs. For all data sets represented in FIG. 5, the injection spray angle is 130°.

Two of the data sets shown in the graph of FIG. 5 relate to prior art piston bowls and show high levels of soot. Prior art piston bowl 1 has no re-entrancy. Prior art piston bowl 2 has a raised floor having a different profile from that of the claimed piston bowl.

The other four data sets in the graph of FIG. 5 show piston bowls that fall within the scope of the claims. These all show significantly reduced levels of soot.

What is claimed is:

1. A piston crown for a piston of an internal combustion engine, the piston crown extending in an axial direction along a central axis and in a radial direction outwardly from the central axis, the piston crown comprising: an annular surface at a first end of the piston crown in the axial direction; and a piston bowl located radially within the annular surface and recessed relative to the first end of the piston crown; wherein the piston bowl comprises:
    a raised floor in a radially central region of the piston bowl;
    an arcuate surface located radially outward relative to the raised floor, the arcuate surface intersects with the raised floor such that there is no inflection in the slope of the arcuate surface; and
    a lip chamfer surface extending along an axis directed radially outwardly from the arcuate surface and radially inwardly from the annular surface wherein a radially inmost portion of the lip chamfer surface is radially inside the radially outermost portion of the arcuate surface and the lip chamfer surface tapers from the annular surface to the radially inmost portion of the lip chamfer surface, and wherein the tapering of the lip chamfer surface enhances uniformity and balance of fuel distribution of fuel injected into the piston bowl; wherein:
    a bowl maximum radius is defined as a distance in the radial direction between the central axis of the piston crown and an innermost edge of the annular surface;
    a bowl height is defined as a distance in the axial direction between the annular surface and a surface of the piston bowl furthest from the annular surface;
    a lip re-entrancy angle is defined as an acute angle between a line extending in the radial direction at the first end of the piston crown and a tangent to the arcuate surface closest to the first end of the piston crown;
    the bowl maximum radius is between 2.4 and 3.0 times the bowl height; and:
    the lip re-entrancy angle is between 40° and 80°.

2. The piston crown of claim 1 wherein an angle between the line extending in the radial direction at the first end of the piston crown and the lip chamfer surface is between 10° and 30°.

3. The piston bowl of claim 1 wherein the raised floor comprises:
    a frusto-conical surface tapering towards the first end of the piston crown; and
    a pip in an end of the frusto-conical surface closest to the first end of the piston crown.

4. The piston bowl of claim 3 wherein the pip is in the form of a spherical dome in a tapered end of the frusto-conical surface.

5. The piston crown of claim 3 wherein an angle between the central axis of the piston crown and the frusto-conical surface is between 60° and 80°.

6. The piston crown of claim 1 wherein the lip re-entrancy angle is between 50° and 70°.

7. The piston crown of claim 1 wherein the bowl maximum radius is 2.69 times the bowl height.

8. The piston crown of claim 1 wherein a bowl throat radius is defined as a distance in the radial direction between the central axis of the piston crown and a radially innermost edge of the lip chamfer surface; and a radial length of the piston crown is defined as a distance in the radial direction between the central axis of the piston crown and an outermost edge of the piston crown; wherein the bowl throat radius is between 0.63 and 0.74 times the radial length.

9. The piston crown of claim 8 wherein the bowl throat radius is between 0.65 and 0.72 times the radial length.

10. The piston crown of claim 9 wherein the bowl throat radius is 0.684 times the radial length.

11. The piston crown of claim 10 wherein the angle between the central axis of the piston crown and the frusto-conical surface is between 60° and 80°.

12. A piston comprising the piston crown of claim 1.

13. A cylinder for an internal combustion comprising the piston of claim 12.

14. The cylinder of claim 13 wherein:
    the cylinder comprises an internal bore having an internal bore radius;
    the piston crown has a bowl throat radius defined as a distance in the radial direction between the central axis of the piston crown and a radially innermost edge of the lip chamfer surface; and wherein:
    wherein the bowl throat radius, R1, is between 0.63 and 0.74 times the internal bore radius, Y.

15. The piston crown of claim 1, wherein the lip chamfer surface has a radial width of 3 to 7 millimetres.

16. The piston crown of claim 1, wherein a surface of the piston bowl furthest from the annular surface is located at a radially inner point of the arcuate surface where it meets the raised floor.

17. A piston crown for a piston of an internal combustion engine, the piston crown extending in an axial direction along a central axis and in a radial direction outwardly from the central axis, the piston crown comprising: an annular surface at a first end of the piston crown in the axial direction; and a piston bowl located radially within the annular surface and recessed relative to the first end of the piston crown; wherein the piston bowl comprises:
    a raised floor in a radially central region of the piston bowl;
    an arcuate surface located radially outward relative to the raised floor, wherein a surface of the piston bowl furthest from the annular surface is located at a radially inner point of the arcuate surface where the surface of the piston bowl furthest from the annular surface meets the raised floor and the arcuate surface intersects with the raised floor such that there is no inflection in the slope of the arcuate surface; and
    a lip chamfer surface extending along a straight axis directed radially outwardly from the arcuate surface and radially inwardly from the annular surface wherein a radially inmost portion of the lip chamfer surface is radially inside the radially outermost portion of the arcuate surface and the lip chamfer surface tapers from the annular surface to the radially inmost portion of the lip chamfer surface, and wherein the tapering of the lip chamfer surface enhances uniformity and balance of fuel distribution of fuel injected into the piston bowl; wherein:

a bowl maximum radius is defined as a distance in the radial direction between the central axis of the piston crown and an innermost edge of the annular surface;

a bowl height is defined as a distance in the axial direction between the annular surface and a surface of the piston bowl furthest from the annular surface;

a lip re-entrancy angle is defined as an acute angle between a line extending in the radial direction at the first end of the piston crown and a tangent to the arcuate surface closest to the first end of the piston crown;

the bowl maximum radius is between 2.6 and 2.8 times the bowl height; and:

the lip re-entrancy angle is between 55° and 65°.

\* \* \* \* \*